US011205010B2

(12) United States Patent
Kayyoor et al.

(10) Patent No.: US 11,205,010 B2
(45) Date of Patent: Dec. 21, 2021

(54) SYSTEMS AND METHODS FOR IDENTIFYING PRIVACY LEAKAGE INFORMATION

(71) Applicant: Symantec Corporation, Mountain View, CA (US)

(72) Inventors: Ashwin Kayyoor, Santa Clara, CA (US); Petros Efstathopoulos, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 540 days.

(21) Appl. No.: 16/228,166

(22) Filed: Dec. 20, 2018

(65) Prior Publication Data

US 2020/0082116 A1   Mar. 12, 2020

Related U.S. Application Data

(63) Continuation-in-part of application No. 16/126,932, filed on Sep. 10, 2018, now Pat. No. 11,010,492.

(51) Int. Cl.
*G06F 21/62* (2013.01)
*G06F 3/0482* (2013.01)
*G06F 16/901* (2019.01)

(52) U.S. Cl.
CPC ........ *G06F 21/6245* (2013.01); *G06F 3/0482* (2013.01); *G06F 16/9027* (2019.01)

(58) Field of Classification Search
CPC .................................................. G06F 21/6245
See application file for complete search history.

(56) References Cited

U.S. PATENT DOCUMENTS

| 2008/0243825 | A1* | 10/2008 | Staddon | G06F 16/332 |
| 2009/0198488 | A1* | 8/2009 | Vigen | G06F 40/30 704/9 |
| 2011/0225129 | A1* | 9/2011 | Agrawal | G06F 16/1748 707/692 |
| 2013/0289977 | A1* | 10/2013 | Tanaka | G06F 21/6254 704/9 |
| 2014/0096261 | A1* | 4/2014 | Boldyrev | G06F 21/00 726/26 |
| 2014/0165137 | A1* | 6/2014 | Balinsky | G06F 21/554 726/1 |
| 2014/0245452 | A1* | 8/2014 | Hurwitz | H04L 63/04 726/26 |

(Continued)

*Primary Examiner* — William S Powers
(74) *Attorney, Agent, or Firm* — FisherBroyles, LLP

(57) ABSTRACT

The disclosed computer-implemented method for identifying privacy leakage information may include (1) identifying, at the computing device, at least one informative word in a digital text and (2) performing a security action that identifies privacy leakage information, where the security action includes (A) determining, for at least one identified informative word, a type of privacy leakage and a respective confidence score indicating a probability the identified informative word causes the type of privacy leakage, (B) determining, using the respective confidence score, a combined confidence score for each respective element within a level of detail to display, and (C) displaying, on a display device, the combined confidence score for each respective element within the level of detail to display. Various other methods, systems, and computer-readable media are also disclosed.

20 Claims, 9 Drawing Sheets

(56) References Cited

U.S. PATENT DOCUMENTS

| | | | |
|---|---|---|---|
| 2015/0254469 A1* | 9/2015 | Butler | G06F 21/6218 |
| | | | 706/12 |
| 2015/0281919 A1* | 10/2015 | Izumi | H04W 4/023 |
| | | | 455/412.2 |
| 2016/0323243 A1* | 11/2016 | LeVasseur | G06F 21/64 |
| 2018/0337939 A1* | 11/2018 | Agarwal | H04L 63/20 |

* cited by examiner

SYSTEMS AND METHODS FOR IDENTIFYING PRIVACY LEAKAGE INFORMATION

CROSS REFERENCE TO RELATED APPLICATION

This application is a continuation-in-part of U.S. application Ser. No. 16/126,932 filed Sep. 10, 2018, the disclosure of which is incorporated, in its entirety, by this reference.

BACKGROUND

When writing text, authors may provide information that inadvertently reveals more personal information than intended. For example, while writing an email, users may use words that appear innocuous but in fact may be quite telling. Such mistakes may be more than merely embarrassing, as revealing sensitive information may subsequently expose users to cyberattacks. Additionally, certain personal information, such as medical information, may in many locations be prohibited from being released. While someone knowing this information may be able to avoid intentional releases of the information, inadvertent releases may occur due to the use of certain words. For example, the term "gp120" refers to a protein associated with HIV. Use of the term "gp120" in an email may reveal just as much medical information as the word "HIV" itself does and should be used with caution or avoided. The instant disclosure, therefore, identifies and addresses a need for systems and methods for identifying privacy leakage information.

SUMMARY

As will be described in greater detail below, the instant disclosure describes various systems and methods for identifying privacy leakage information.

In one example, a method for identifying privacy leakage information may include (i) identifying, at the computing device, at least one informative word in digital text and (ii) performing a security action that identifies privacy leakage information, where the security action includes (A) determining, for at least one identified informative word, a type of privacy leakage and a respective confidence score indicating a probability the identified informative word causes the type of privacy leakage, (B) determining, using the respective confidence score, a combined confidence score for each respective element within a level of detail to display, and (C) displaying, on a display device, the combined confidence score for each respective element within the level of detail to display.

In one example, the method may further include receiving, from a graphical user interface, an input indicating the level of detail to display.

In some examples, the digital text may be in a set of electronic documents.

In some embodiments, the level of detail to display may be in a hierarchy of detail including (i) a document level of detail, (ii) a sentence level of detail, and (iii) a word level of detail. In an embodiment, the level of detail to display may be a document level of detail and each respective element may be a document. In one example, the level of detail to display may be a sentence level of detail and each respective element may be a sentence. In some examples, the level of detail to display may be a word level of detail and each respective element may be a word.

In some embodiments, the determining the combined confidence score for each respective element may further include (i) adding respective confidence scores for each type of privacy leakage for each identified informative word in the respective element, (ii) normalizing the sum of respective confidence scores, and (iii) sorting the normalized sum.

In an embodiment, the displaying may further include determining a two-way tree-structured index including (i) the combined confidence score for each respective element within each of the levels of detail and (ii) associations between related elements across different levels of detail. In one example, the displaying may further include identifying the combined confidence score to display by (i) receiving an input indicating a requested level of detail to display, (ii) retrieving, based on the received input, the combined confidence score from the two-way tree-structured index, and (iii) displaying, on the display device, the retrieved combined confidence score.

In some examples, the displaying may further include determining a two-way tree-structured index including (i) a first list of types of privacy leakage, ranked by respective confidence scores, for each respective element within each of the levels of detail, (ii) respective confidence scores for each type of privacy leakage in the first list, (iii) a second list of subtypes of privacy leakage, ranked by respective confidence scores, for each respective type of privacy leakage in the second list, (iv) respective confidence scores for each subtype of privacy leakage in the first list, (v) the respective elements within each of the levels of detail, and (vi) associations between related elements across different levels of detail. In some embodiments, the displaying may further include identifying per-element privacy leakage detail to display by (i) receiving an input indicating a requested level of per-element privacy leakage detail to display, (ii) retrieving, from the two-way tree-structured index and based on the received input, per-element privacy leakage detail and respective confidence scores from at least one of the first list and the second list within the requested level of detail to display, and (iii) displaying, on the display device, the retrieved per-element privacy leakage detail and the respective confidence scores.

In an embodiment, the security action may further include replacing the at least one informative word in the digital text with at least one replacement word.

In one embodiment, a system for identifying privacy leakage information may include at least one physical processor and physical memory that includes computer-executable instructions that, when executed by the physical processor, cause the physical processor to (i) identify, at the system, at least one informative word in digital text and (2ii) perform a security action that identifies privacy leakage information, where the security action includes (A) determining, for at least one identified informative word, a type of privacy leakage and a respective confidence score indicating a probability the identified informative word causes the type of privacy leakage, (B) determining, using the respective confidence score, a combined confidence score for each respective element within a level of detail to display, and (C) displaying, on a display device, the combined confidence score for each respective element within the level of detail to display.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, at the computing device, at least one informative word in digital text and (ii) perform a security action that identifies privacy leakage information, where the security action includes (A) determining, for at least one identified informative word, a type of privacy leakage and a respective confidence score indicating a probability the identified informative word causes the type of privacy leakage, (B) determining, using the respective confidence score, a combined confidence score for each respective element within a level of detail to display, and (C) displaying, on a display device, the combined confidence score for each respective element within the level of detail to display.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
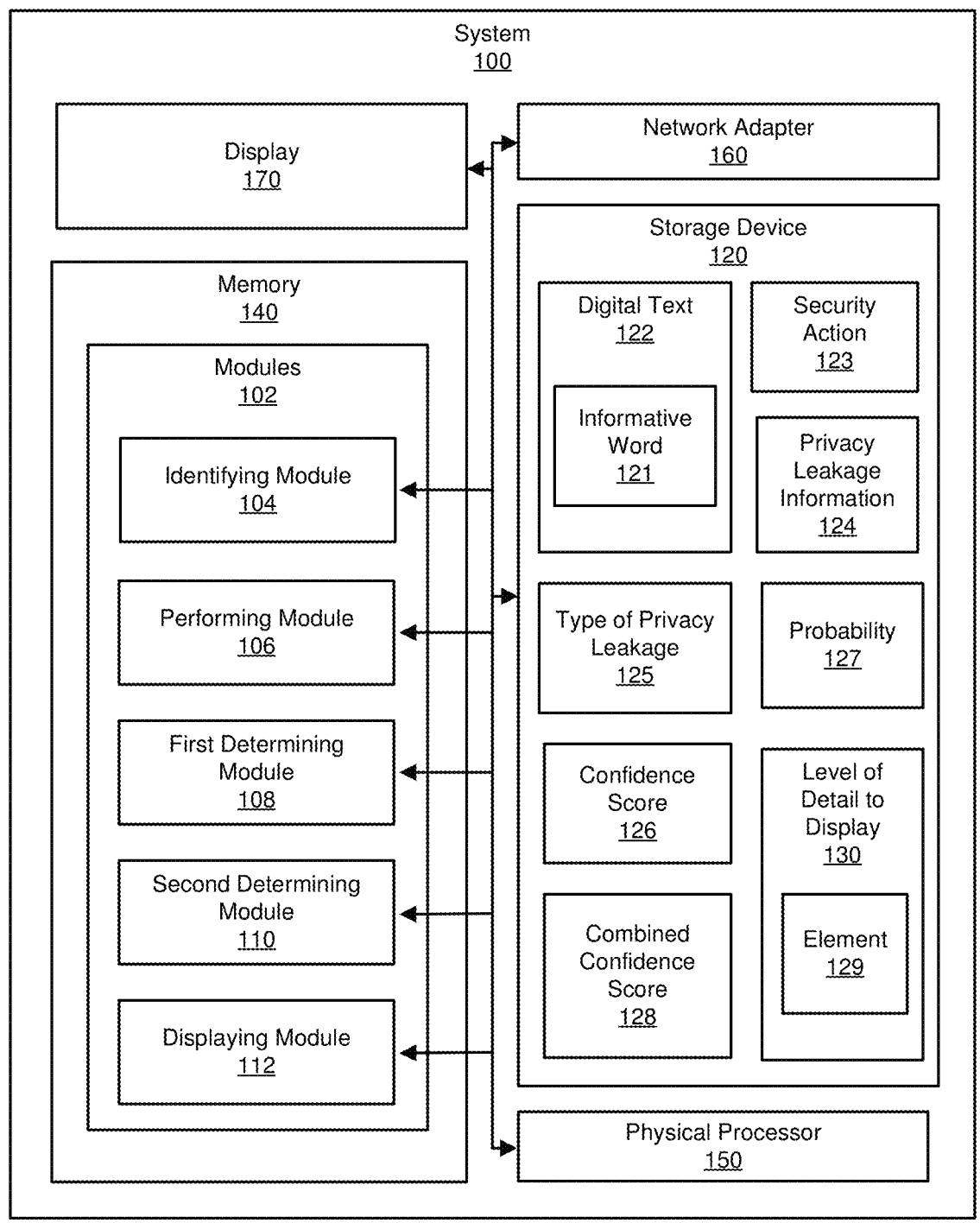
FIG. 1 is a block diagram of an example system for identifying privacy leakage information.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying privacy leakage information. In some examples, the provided systems and methods may measure top-K privacy leakages (PLs) with confidence scores and enable "zoom-in" and "zoom-out" features for displaying privacy leakages across various different levels of data detail (words, sentences, etc.) and across various different levels of sensitive topic detail.

In some embodiments, privacy leakage may involve personal information and/or sensitive information that may be shared with websites and/or applications other than the websites and/or applications to which that personal information was initially provided. For example, privacy leakage may occur as a result of sending digital text in a form of emails, text messages, chat messages, and/or web browser messaging via non-private networks such as the Internet.

In some embodiments, the provided techniques may include systems to detect privacy leakage for unstructured data such as documents. In some examples, for sets of documents, the provided techniques may detect privacy leakage at various different levels of data detail, such as detecting privacy leakage across at least one document, at least one sentence within a document, at least one word within documents, at least one word within sentences, the like, or a combination thereof. In an example, a hierarchy of level of data detail may be: documents↔<-->document<-->sentences<-->word. In some examples, the provided techniques may detect privacy leakage at various different levels of sensitive topic details. The systems may have drag and drop interfaces where at least one document may be dropped for analysis. The systems may depict top-k privacy leakages for each document, along with associated confidence scores.

If users are interested in exploring (i.e., "zooming-in") further into a particular document, then users may select that document and the system may show sentences and corresponding top-k privacy leakages for each sentence, along with respective confidence scores. Users may "zoom-in" further into a sentence or set of sentences to understand effects of individual words on the top-k privacy leakages. Once zoomed-in, the system may enable users to "zoom-out" into analysis of coarser levels of detail of data. Similarly, for a particular level of detail of data, users may choose to "zoom-in" into a particular privacy leakage to discover more information about subtopics and "zoom-out" to coarser levels of detail about subtopics. For example, if users want to investigate one level deeper into a particular sensitive topic, say political ideology, then the provided systems and methods analyze privacy leakages at one level of detail deeper into subtopics such as liberal, conservative, moderate, apolitical, etc. In some examples, the provided techniques may provide confidence scores of detected privacy leakage at different data levels of detail and/or different sensitive topic levels of detail.

In some examples, provided are (i) techniques to calculate privacy leakage of sentences and documents using privacy leakage of most informative words, (ii) a privacy leakage (PL) index that enables depicting privacy leakage at different levels of data detail (i.e., granularity), (iii) techniques for providing depicting privacy sensitiveness at different levels of detail, and/or (iv) techniques for providing depicting privacy leakage at different levels of detail based on a public corpus analysis (e.g., digital information available from the Internet).

By doing so, the systems and methods described herein may improve the functionality of a computing device and/or provide targeted protection against privacy leakage, and thus improve fields of privacy protection in general, by providing methods for automatically identifying and/or mitigating privacy leakage in digital text. Examples of the provided techniques improve a state of security of computing devices from which sensitive information may be gleaned (e.g., network-connected devices), resulting in retaining privacy of sensitive information, significant time savings, and/or significant monetary savings. Thus, the disclosed systems and methods may provide asset protection for common targets of anti-privacy attacks, such as home networks, IoT networks, hospitals, shipping companies, financial companies, governments, etc.

Figure 2:
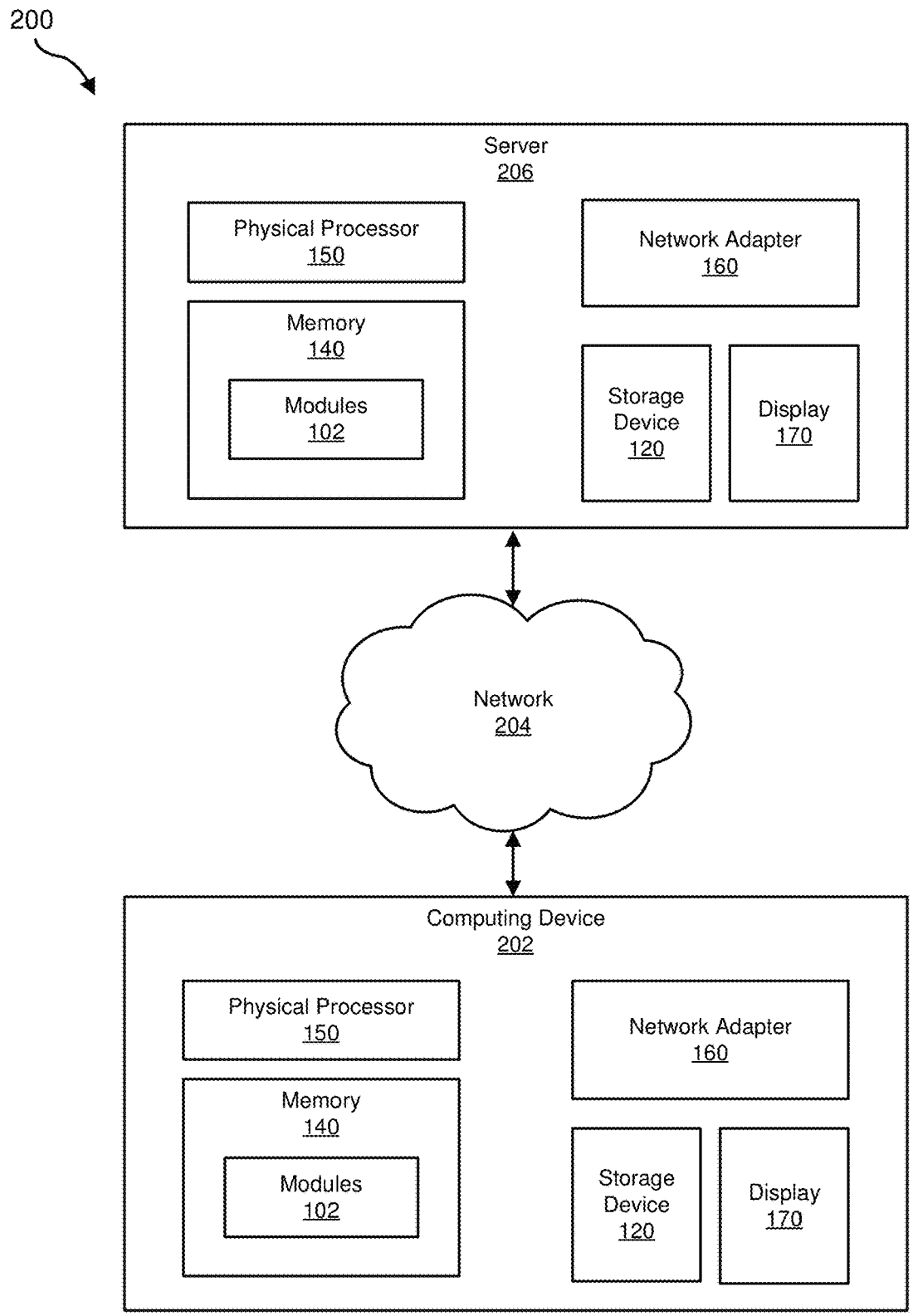
FIG. 2 is a block diagram of an additional example system for identifying privacy leakage information.

The following will provide, with reference to FIGS. 1-2, detailed descriptions of example systems for identifying privacy leakage information. Detailed descriptions of corresponding computer-implemented methods will also be provided in connection with FIG. 3. Detailed descriptions of example implementations will also be provided in connection with FIGS. 4-7. In addition, detailed descriptions of an example computing system and network architecture capable of implementing one or more of the embodiments described herein will be provided in connection with FIGS. 8 and 9, respectively.

FIG. 1 is a block diagram of an example system 100 for identifying privacy leakage information. As illustrated in this figure, example system 100 may include one or more modules 102 for performing one or more tasks. As will be explained in greater detail below, modules 102 may include an identifying module 104, a performing module 106, a first determining module 108, a second determining module 110, and/or a displaying module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of characteristics of an informative word 121, a digital text 122, a security action 123, privacy leakage information 124, a type of privacy leakage 125, a confidence score 126, a probability 127 that an identified informative word causes a type of privacy leakage, a combined confidence score 128, an element 129, and/or a level of detail to display 130. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 150. Physical processor 150 generally represents any type or form of hardware-implemented processing unit capable of interpreting and/or executing computer-readable instructions. In one example, physical processor 150 may access and/or modify one or more of modules 102 stored in memory 140. Additionally or alternatively, physical processor 150 may execute one or more of modules 102 to facilitate identifying privacy leakage information. Examples of physical processor 150 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more network adapters, such as network adapter 160. In some examples, network adapter 160 may be a physical network adapter connected to a physical network (e.g., network 204 in FIG. 2).

As illustrated in FIG. 1, example system 100 may also include one or more display devices, such as display 170. Display 170 generally represents any type or form of device capable of visually displaying information (e.g., to a user). In some examples, display 170 may present a graphical user interface (e.g., to enable user interaction with system 100). In non-limiting examples, display 170 may present at least a portion of informative word 121, digital text 122, security action 123, privacy leakage information 124, type of privacy leakage 125, confidence score 126, probability 127 that an identified informative word causes a type of privacy leakage, combined confidence score 128, element 129, and/or level of detail to display 130.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to identify privacy leakage information. For example, and as will be described in greater detail below, one or more of modules 102 may cause computing device 202 and/or server 206 to (i) identify, at system 100, at least one informative word 121 in digital text 122 and (ii) perform security action 123 that identifies privacy leakage information 124, where security action 123 may include (A) determining, for at least one identified informative word 121, type of privacy leakage 125 and respective confidence score 126 indicating probability 127 the identified informative word 121 causes the type of privacy leakage 125, (B) determining, using the respective confidence score 126, combined confidence score 126 for each respective element 129 within level of detail to display 130, and (C) displaying, on display 170, the combined confidence score 128 for each respective element 129 within the level of detail to display 130.

Computing device 202 generally represents any type or form of computing device capable of reading computer-executable instructions. In some examples, computing device 202 may represent a computer running security software, such as anti-malware software and/or privacy software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device capable of reading computer-executable instructions. In some examples, server 206 may represent a computer running security software, such as anti-malware software and/or privacy software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
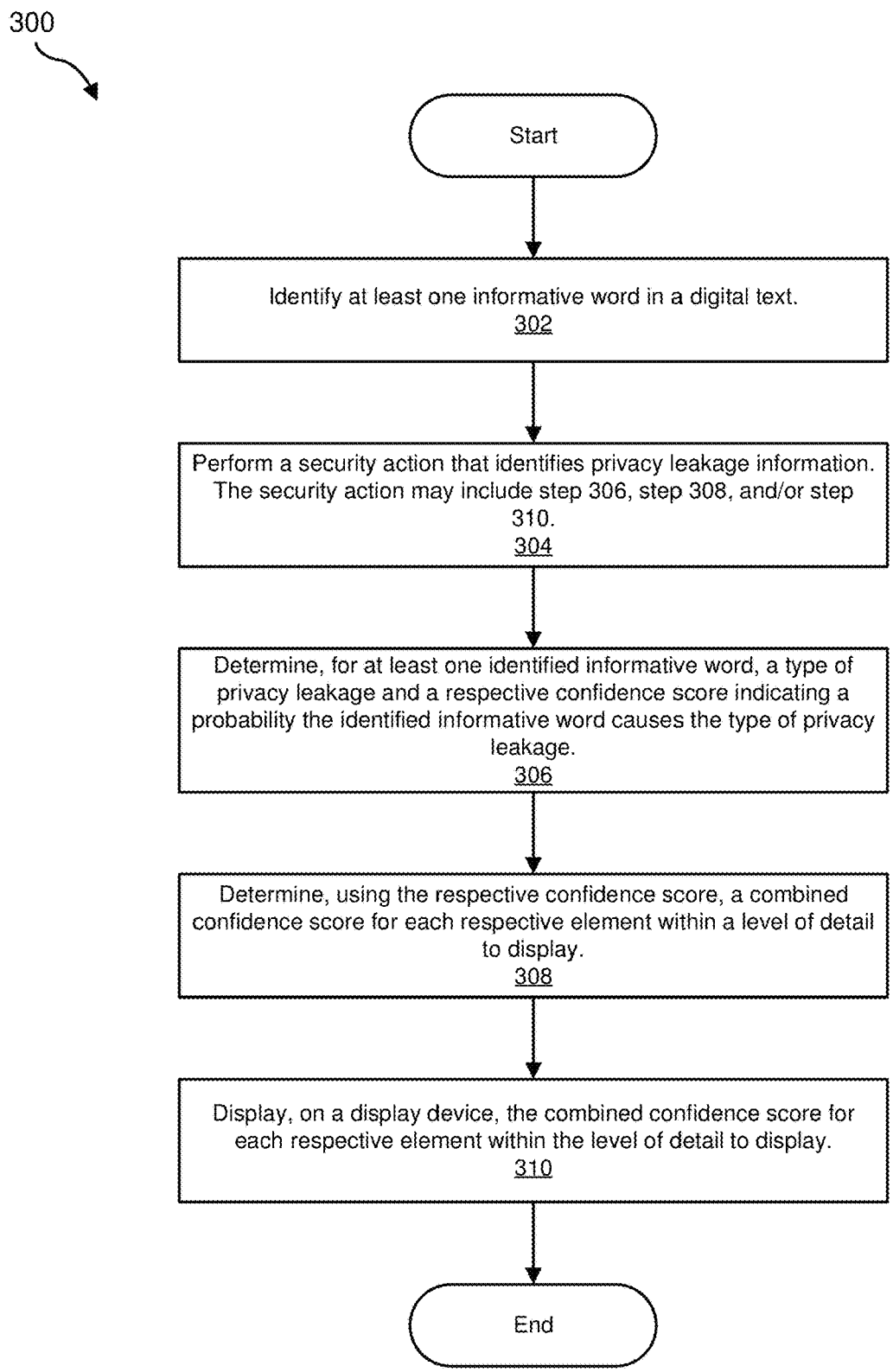
FIG. 3 is a flow diagram of an example method for identifying privacy leakage information.

FIG. 3 is a flow diagram of an example computer-implemented method 300 for identifying privacy leakage information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify (e.g., at a computing device such as system 100), at least one informative word (i.e., sensitive word) in digital text. The systems described herein may perform step 302 in a variety of ways. For example, identifying module 104 may, as part of computing device 202 and/or server 206 in FIG. 2, identify, at system 100, at least one informative word 121 in digital text 122.

In some examples, the digital text may be in a set of electronic documents. In one example, the digital text may be unstructured data. In some examples, a drag-and-drop feature may enable selecting at least one document for processing by method 300. In some examples, a drag-and-drop feature may enable selecting at least one sentence for processing by method 300.

In some examples, the provided techniques may perform part of speech (POS) tagging and may extract proper nouns and named entities to identify informative words. For example, in the example sentence ($S_j$)="Work is going on well and for the long weekend, I cooked Baklava," the words "baklava" and "weekend" are the most informative words as the word baklava is a named entity and weekend is a proper noun.

In some examples, method 300 may be executed by and/or from a plug-in within a messaging application, an email plug-in, a chat plug-in, a browser extension, the like, or a combination thereof executing on system 100, but in general any words, phrases, or other terms may be analyzed for privacy leakage risks.

In some examples, informative words may be displayed on a display and may be highlighted for ease of reference by users.

As illustrated in FIG. 3, at step 304 one or more of the systems described herein may perform a security action that identifies privacy leakage information. The security action may include step 306, step 308, and/or step 310. The systems described herein may perform step 304 in a variety of ways. For example, performing module 106 may, as part of computing device 202 and/or server 206 in FIG. 2, perform security action 123 that identifies privacy leakage information 124. The security action 123 may include step 306, step 308, and/or step 310.

In an embodiment, the security action may further include replacing the at least one informative word in the digital text with at least one replacement word.

In some examples, security action 123 may be performed according to data loss prevention (DLP) policies. Example security actions may include blocking access to devices (e.g., storage devices, memories, network devices, etc.), allowing limited access to devices, allowing read-only access to devices, encrypting information, and/or other acts limiting access to devices. In some examples, security actions may be performed automatically. In some embodiments, security actions may be performed based on a level of sensitivity of information that executing processes may attempt to transfer.

In some embodiments, security actions may attempt to identify and/or ameliorate potential security risks posed by processes executing in containers. In some examples, security actions many include blocking access to and/or by the executing processes. In additional examples, the security actions may include displaying, on user displays, warnings indicating that processes are potentially dangerous. In some examples, the security actions may further include allowing the processes access to information that only authenticated processes may access.

As illustrated in FIG. 3, at step 306 one or more of the systems described herein may determine, for at least one identified informative word, a type of privacy leakage and a respective confidence score indicating a probability the identified informative word causes the type of privacy leakage. The systems described herein may perform step 306 in a variety of ways. For example, first determining module 108 may, as part of computing device 202 and/or server 206 in FIG. 2, determine, for at least one identified informative word 121, type of privacy leakage 125 and respective confidence score 126 indicating probability 127 the identified informative word 121 causes the type of privacy leakage 125.

Figure 4:
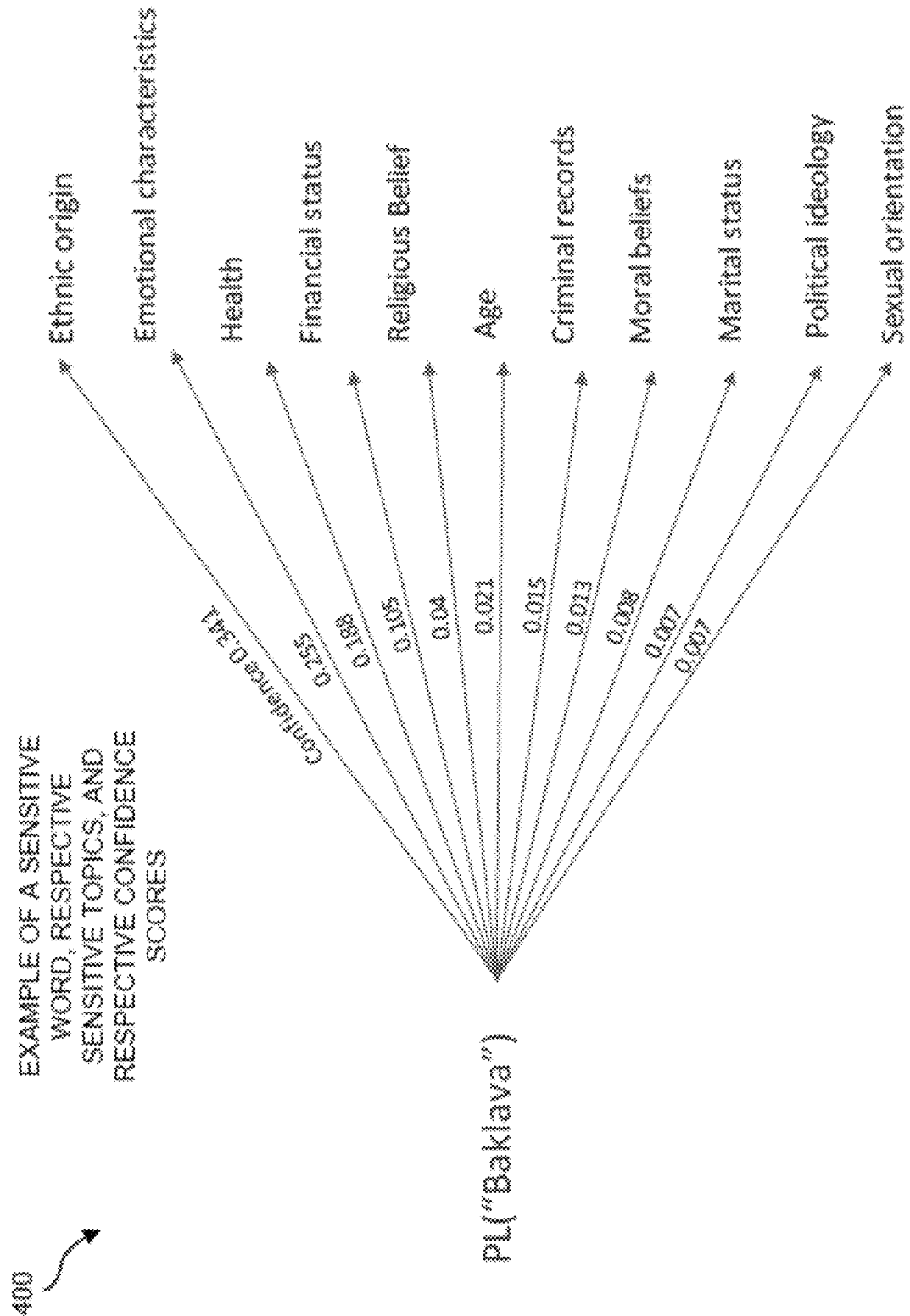
FIG. 4 is a diagram of an example sensitive word, example respective sensitive topics, and example respective confidence scores.

We turn now to FIG. 4, which includes a diagram 400 of an example sensitive word, example respective sensitive topics, and example respective confidence scores. On each identified informative word, the provided techniques find an association between the identified informative word and respective sensitive topics with corresponding probable privacy leakage confidence scores. FIG. 4 depicts an example of informative word "Baklava" that is associated with respective sensitive topics shown on the right. In this example, the sensitive topics are sorted in order of privacy leakage confidence scores. For example, FIG. 4 depicts that the word "Baklava" leaks sensitive topic information about ethnic origin with probability or confidence 0.341.

We now return to FIG. 3. In some examples, the number of privacy leakage topics for a respective word may be user-determined. For example, method 300 may include receiving a user input (e.g., k=4) indicating that privacy leakage topics having the four highest confidence scores are to be identified and/or subsequently processed for at least one identified informative word.

As illustrated in FIG. 3, at step 308 one or more of the systems described herein may determine, using the respective confidence score, a combined confidence score for each respective element within a level of detail to display. The systems described herein may perform step 308 in a variety of ways. For example, second determining module 110 may, as part of computing device 202 and/or server 206 in FIG. 2, determine, using the respective confidence score 126, combined confidence score 128 for each respective element 129 within level of detail to display 130.

In one example, method 300 may include receiving, from a graphical user interface, an input indicating the level of detail to display. In some examples, the level of detail to display may be in a hierarchy of detail including (i) a document level of detail, (ii) a sentence level of detail, and/or (iii) a word level of detail. In an embodiment, the level of detail to display may be a document level of detail and each respective element may be a document. In one example, the level of detail to display may be a sentence level of detail and each respective element may be a sentence. In some examples, the level of detail to display may be a word level of detail and each respective element may be a word. In some examples, the level of detail to display may be in a hierarchy of topical detail including (i) topic level of detail, (ii) a subtopic level of detail, and/or (iii) a sub-subtopic level of detail.

In some embodiments, the determining the combined confidence score for each respective element may further include (i) adding respective confidence scores for each type of privacy leakage for each identified informative word in the respective element, (ii) normalizing the sum of respective confidence scores, and/or (iii) sorting the normalized sum.

As illustrated in FIG. 3, at step 310 one or more of the systems described herein may display, on a display device (e.g., display 170), the combined confidence score for each respective element within the level of detail to display. The systems described herein may perform step 310 in a variety of ways. For example, displaying module 112 may, as part of computing device 202 and/or server 206 in FIG. 2, display (e.g., on display 170) the combined confidence score 128 for each respective element 129 within the level of detail to display 130.

In some examples, informative words may be displayed on a graphical user interface on a display and may be highlighted for ease of reference by users. In some embodiments, when a cursor may be located substantially near an informative word displayed on a graphical user interface, privacy leakage details (e.g., privacy leakage topics and/or respective confidence scores) may be displayed on the graphical user interface.

In some embodiments, PL(w) may be a privacy leakage of an individual word "w" and a set of informative words in a sentence "$S_j$" may be identified, and the privacy leakage of sentence $S_j$, may be calculated as a function of privacy leakages of individual informative words within that sentence. In some embodiments, $D_i$ represents a document, $S_j$ represents a sentence, and $w_k$ represents a word. Thus, privacy leakage of a word $w_i$=PL($w_i$). Further, If $\{w|w \in S_j\}$ is a set of words that belong to a sentence $S_j$ then PL($S_j$)=f($\{PL(w)|w \in S_j\}$) where f( )=Sort(Norm(Sum($\{PLs\}$))). Privacy leakage of a document may be calculated as well, once privacy leakage of constituent sentences within the document are calculated. Thus, privacy leakage of a document "$D_i$" may be determined as PL($D_i$)=Sort(Norm(Sum($\{PL(S_j)|S_j \in D_i\}$))).

Figure 5:
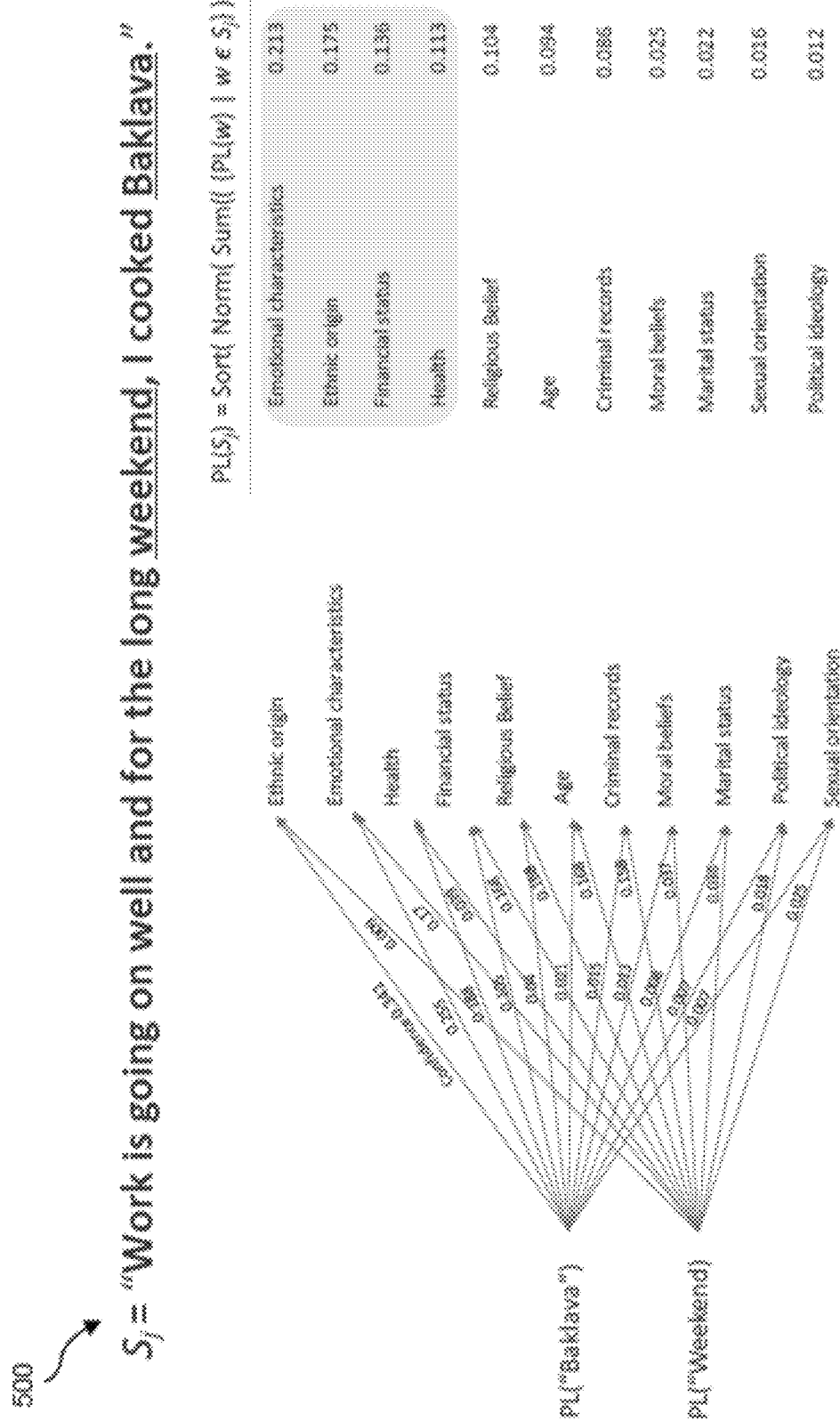
FIG. 5 is a diagram of an example sentence having example sensitive words, example respective sensitive topics, and example respective confidence scores.

We turn now to FIG. 5, which includes a diagram 500 of an example sentence having example sensitive words, example respective sensitive topics, and example respective confidence scores. The example sentence (Sj) is "Work is going on well and for the long weekend, I cooked baklava" and the identified informative words are "weekend" and "baklava." Thus, using the privacy leakage information for words "Baklava" and "Weekend" shown in FIG. 5, the provided techniques may determine a combined confidence score for identified privacy leakage (PL) topics for the example sentence by adding the confidence scores of corresponding sensitive topics, then normalize the sum, and sorting in descending order of final confidence scores. For example, PL($S_j$)=Sort(Norm(Sum(PL("baklava")+("weekend")))). The diagram 500 also identifies the top four (i.e., k=4) privacy leakage topics of this sentence. We now return to FIG. 3.

In an embodiment, the displaying may further include determining a two-way tree-structured index including (i) the combined confidence score for each respective element within each of the levels of detail and (ii) associations between related elements across different levels of detail. In one example, the displaying may further include identifying the combined confidence score to display by (i) receiving an input indicating a requested level of detail to display, (ii) retrieving, based on the received input, the combined confidence score from the two-way tree-structured index, and/or (iii) displaying (e.g., on display 170) the retrieved combined confidence score.

Figure 6:
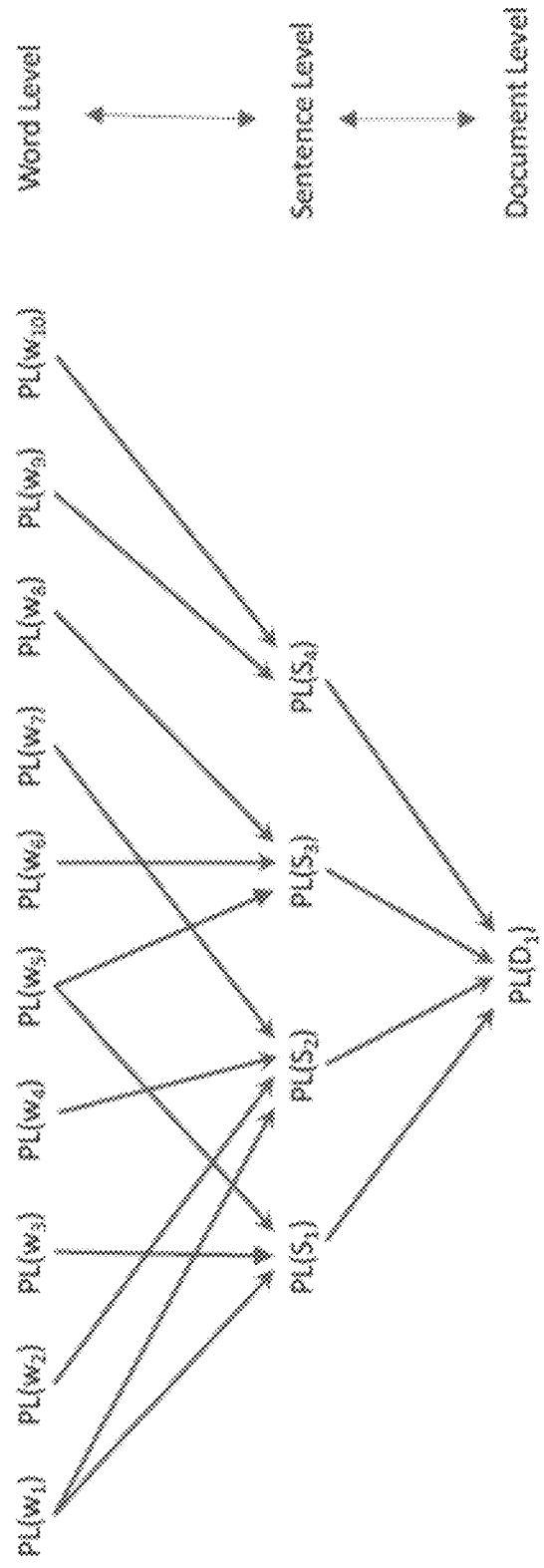
FIG. 6 is a diagram of an example privacy leakage index and example levels of detail.

We turn now to FIG. 6, which includes a diagram 600 of an example privacy leakage index and example levels of detail. In one example, the provided techniques use recursive definitions of privacy leakage to build a two-way tree-structured index (e.g., PL-Index), where data associations and relationship between privacy leakages may be explicitly maintained. For example, associations between most informative words and sentences and in-turn associations between sentences and document to which they belong may be maintained. Most informative words and corresponding privacy leakages form the leaves or base of this tree shaped index. There may be multiple roots to this index, where each root may be an individual document (the example of FIG. 6 depicts only one document). When querying privacy leakage of a particular document, the query may be propagated to sentence-level nodes to calculate sentence level privacy leakages and from there the query for each sentence level privacy leakage may be propagated to word-level nodes. The results are combined to form privacy leakage of a document. During this computation, each privacy leakage may be indexed at a corresponding node to enable zooming-in and zooming-out to display a level of detail. We now return to FIG. 3.

In some examples, the displaying may further include determining a two-way tree-structured index including (i) a first list of types of privacy leakage, ranked by respective confidence scores, for each respective element within each of the levels of detail, (ii) respective confidence scores for each type of privacy leakage in the first list, (iii) a second list of subtypes of privacy leakage, ranked by respective confidence scores, for each respective type of privacy leakage in the second list, (iv) respective confidence scores for each subtype of privacy leakage in the first list, (v) the respective elements within each of the levels of detail, and/or (vi) associations between related elements across different levels of detail. In some embodiments, the displaying may further include identifying per-element privacy leakage detail to display by (i) receiving an input indicating a requested level of per-element privacy leakage detail to display, (ii) retrieving, from the two-way tree-structured index and based on the received input, per-element privacy leakage detail and respective confidence scores from at least one of the first list and the second list within the requested level of detail to display, and/or (iii) displaying (e.g., on display 170) the retrieved per-element privacy leakage detail and the respective confidence scores.

Figure 7:
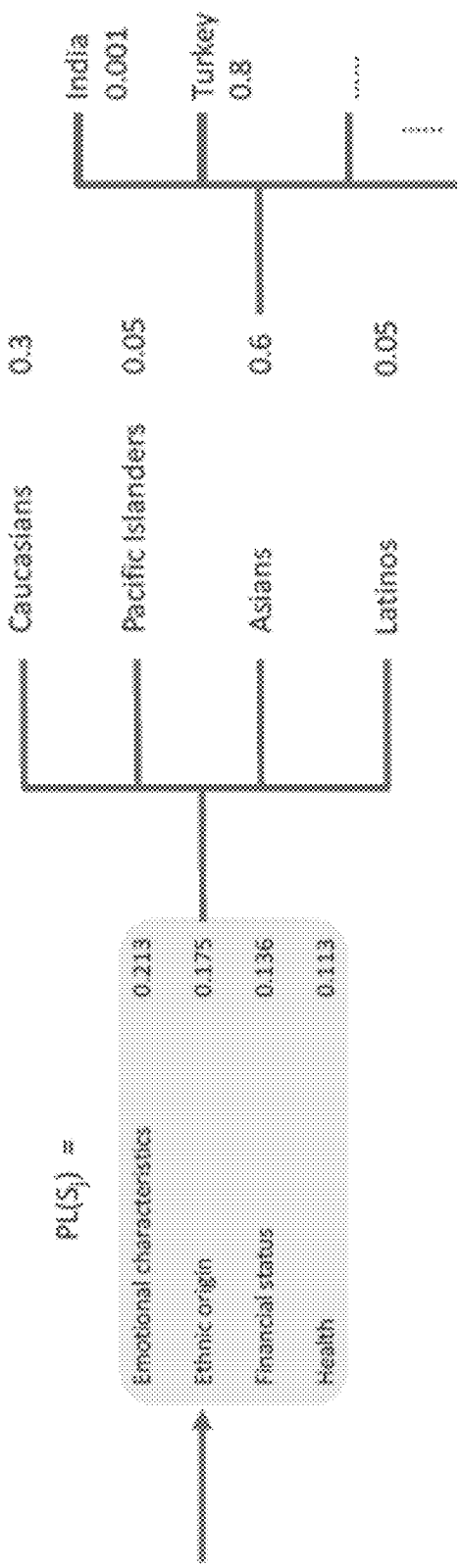
FIG. 7 is a diagram of an example sensitive topics at example levels of detail.

We turn now to FIGS. 5 and 7. FIG. 7 is a diagram 700 of example sensitive topics at example levels of detail. FIG. 5 depicts example top-four privacy leakages for our example sentence ("Emotional Characteristics": 0.213, "Ethnic Origin": 0.175, "Financial Status": 0.136, "Health": 0.113). When a user wants to zoom-in into "Ethnic Origin" topics to understand privacy leakage at one level deeper level, then the system identifies "Caucasians", "Pacific Islanders", "Asians", and "Latinos" as possible subtopics, and calculates respective confidence scores of these subtopics "Caucasians": 0.3, "Pacific Islanders": 0.05, "Asians": 0.6, "Latinos": 0.05. Note that since sentence $S_j$ has the keyword "Baklava", $PL(S_j)$ has "Ethnic Origin" as a type of privacy leakage (i.e. a privacy leakage topic), when user requests a higher level of detail, the systems identify "Asians" as a major privacy leakage topic because subtopic "Asians" has a high relative confidence score. From this subtopic, when the user requests a higher level of detail, the system reveals "Turkey" as the major private information leaked because sub-subtopic "Turkey" has a high relative confidence score.

As detailed above, the steps outlined in method 300 in FIG. 3 may enable identifying privacy leakage information. For example, the systems described herein may measure top-K privacy leakages with confidence scores and enable "zoom-in" and "zoom-out" features for displaying privacy leakages across various different levels of data detail (words, sentences, etc.) and across different levels of sensitive topic detail. By doing so, the systems and methods described herein may improve functioning of a computing device and/or provide targeted protection against privacy leakage, and thus improve fields of privacy protection in general, by providing a method for automatically identifying privacy leakage in digital text. Examples of the provided techniques improve a state of security of computing devices from which sensitive information may be gleaned (e.g., network-connected devices), resulting in retaining privacy of sensitive information.

Figure 8:
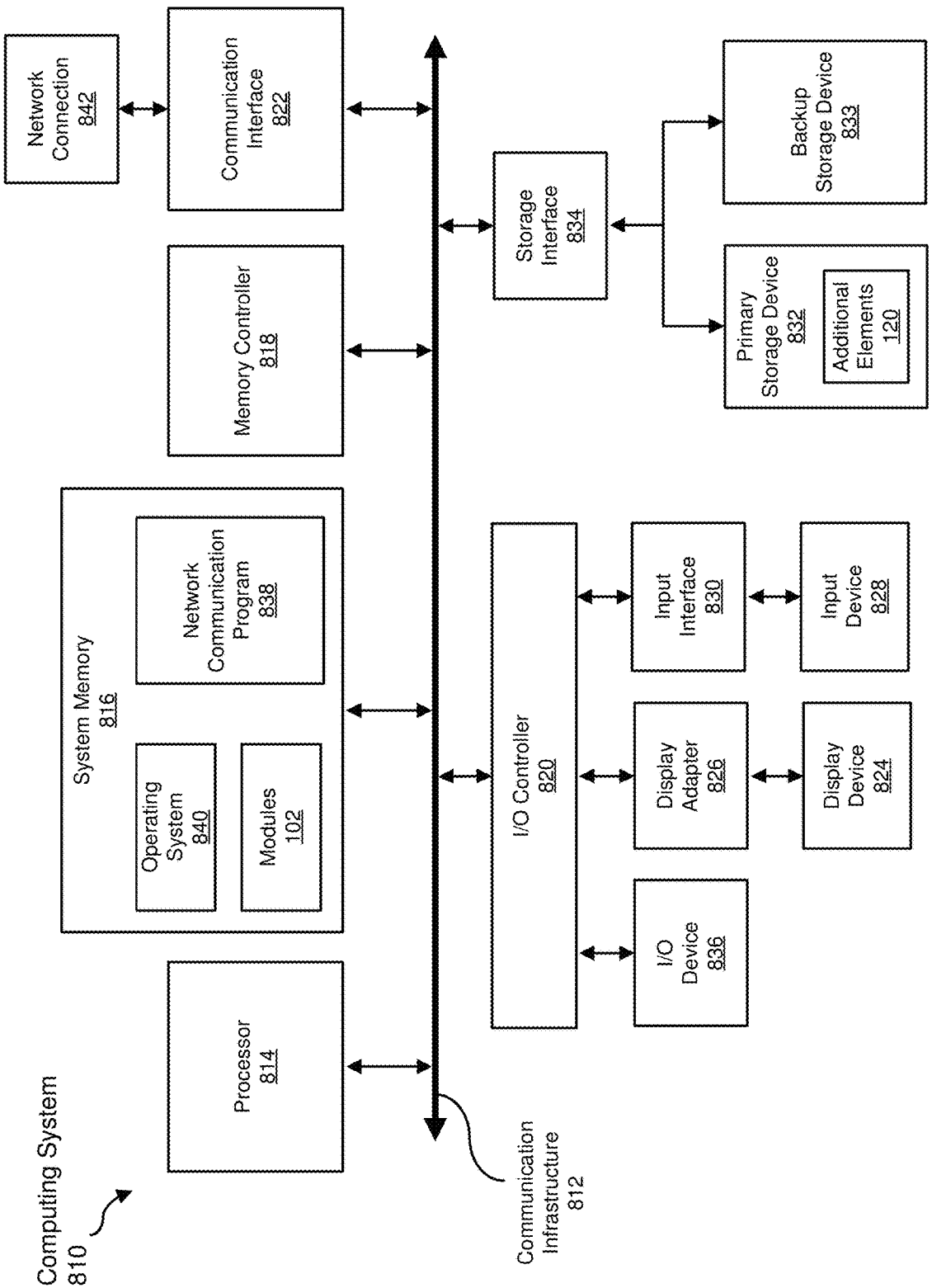
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, storage device 120 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
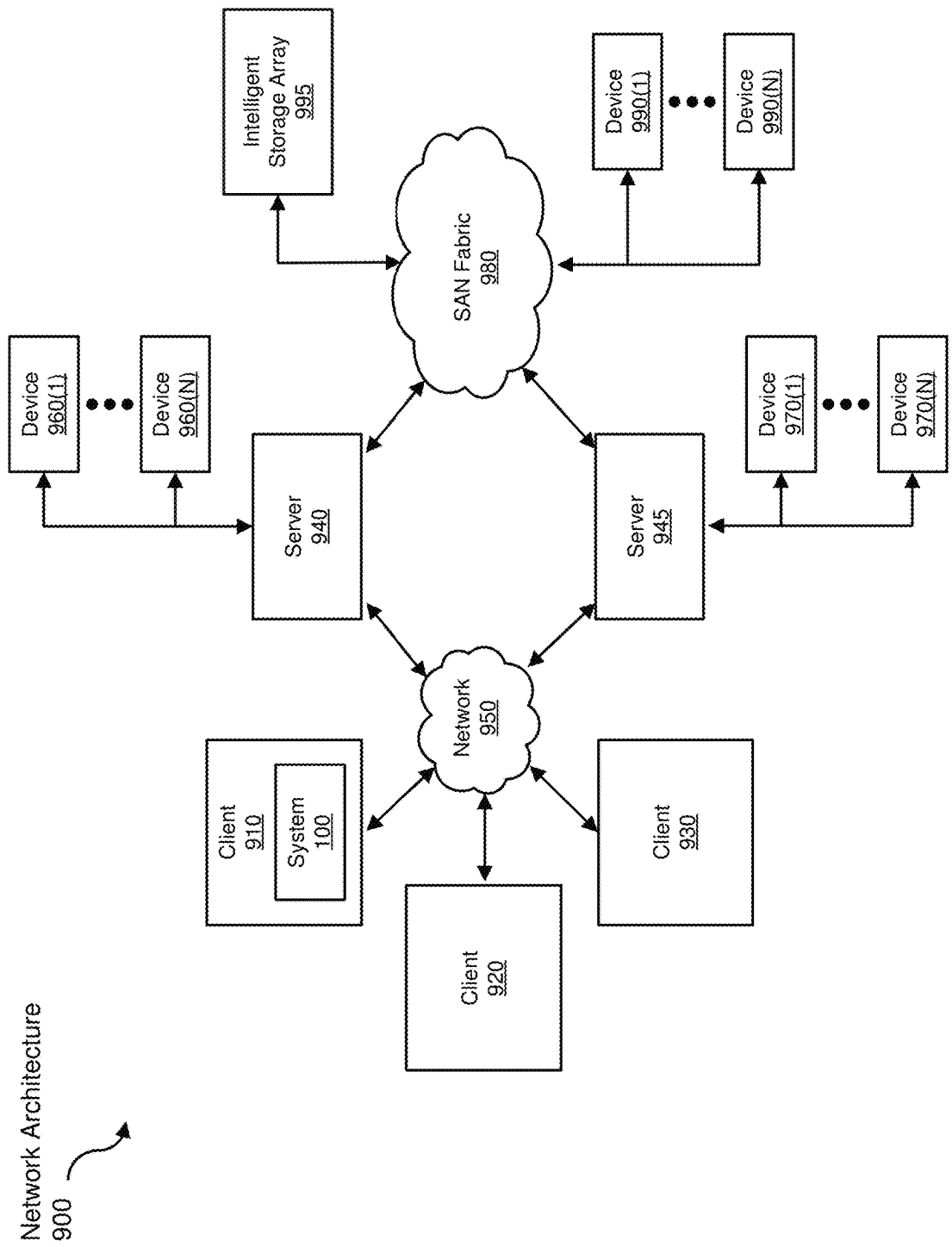
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for identifying privacy leakage information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive digital text to be transformed, transform the digital text, output a result of the transformation to a display, use the result of the transformation to trigger a security action, and/or store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying privacy leakage information, at least a portion of the method being performed by a computing device comprising at least one processor, the method comprising:
   identifying, at the computing device, at least one informative word in a digital text; and
   performing a security action that identifies privacy leakage information, wherein the security action comprises:
      determining, for at least one identified informative word, a type of privacy leakage and a respective confidence score indicating a probability the identified informative word causes the type of privacy leakage;
      determining, using the respective confidence score, a combined confidence score for each respective element within a level of detail to display; and
      displaying, on a display device, the combined confidence score for each respective element within the level of detail to display.

2. The computer-implemented method of claim 1, further comprising receiving, from a graphical user interface, an input indicating the level of detail to display.

3. The computer-implemented method of claim 1, wherein the digital text is in a set of electronic documents.

4. The computer-implemented method of claim 1, wherein the level of detail to display is in a hierarchy of detail comprising:
   a document level of detail;
   a sentence level of detail; and
   a word level of detail.

5. The computer-implemented method of claim 1, wherein the level of detail to display is a document level of detail and each respective element is a document.

6. The computer-implemented method of claim 1, wherein the level of detail to display is a sentence level of detail and each respective element is a sentence.

7. The computer-implemented method of claim 1, wherein the level of detail to display is a word level of detail and each respective element is a word.

8. The computer-implemented method of claim 1, wherein the determining the combined confidence score for each respective element further comprises:
   adding respective confidence scores for each type of privacy leakage for each identified informative word in the respective element;
   normalizing the sum of respective confidence scores; and
   sorting the normalized sum.

9. The computer-implemented method of claim 1, wherein the displaying further comprises determining a two-way tree-structured index comprising:
   the combined confidence score for each respective element within each of the levels of detail; and
   associations between related elements across different levels of detail.

10. The computer-implemented method of claim 9, wherein the displaying further comprises identifying the combined confidence score to display by:
    receiving an input indicating a requested level of detail to display;
    retrieving, based on the received input, the combined confidence score from the two-way tree-structured index; and
    displaying, on the display device, the retrieved combined confidence score.

11. The computer-implemented method of claim 1, wherein the displaying further comprises determining a two-way tree-structured index comprising:
    a first list of types of privacy leakage, ranked by respective confidence scores, for each respective element within each of the levels of detail;
    respective confidence scores for each type of privacy leakage in the first list;
    a second list of subtypes of privacy leakage, ranked by respective confidence scores, for each respective type of privacy leakage in the second list;
    respective confidence scores for each subtype of privacy leakage in the first list;
    the respective elements within each of the levels of detail; and
    associations between related elements across different levels of detail.

12. The computer-implemented method of claim 11, wherein the displaying further comprises identifying per-element privacy leakage detail to display by:
    receiving an input indicating a requested level of per-element privacy leakage detail to display;
    retrieving, from the two-way tree-structured index and based on the received input, per-element privacy leakage detail and respective confidence scores from at least one of the first list and the second list within the requested level of detail to display; and
    displaying, on the display device, the retrieved per-element privacy leakage detail and the respective confidence scores.

13. The computer-implemented method of claim 1, wherein the security action further comprises replacing the at least one informative word in the digital text with at least one replacement word.

14. A system for identifying privacy leakage information, the system comprising:
- at least one physical processor; and
- physical memory comprising computer-executable instructions that, when executed by the physical processor, cause the physical processor to:
  - identify, at the system, at least one informative word in a digital text; and
  - perform a security action that identifies privacy leakage information, wherein the security action comprises:
    - determining, for at least one identified informative word, a type of privacy leakage and a respective confidence score indicating a probability the identified informative word causes the type of privacy leakage;
    - determining, using the respective confidence score, a combined confidence score for each respective element within a level of detail to display; and
    - displaying, on a display device, the combined confidence score for each respective element within the level of detail to display.

15. The system of claim 14, further computer-executable instructions that, when executed by the physical processor, cause the physical processor to receive, from a graphical user interface, an input indicating the level of detail to display.

16. The system of claim 14, wherein the displaying further comprises determining a two-way tree-structured index comprising:
- the combined confidence score for each respective element within each of the levels of detail; and
- associations between related elements across different levels of detail.

17. The system of claim 16, wherein the displaying further comprises identifying the combined confidence score to display by:
- receiving an input indicating a requested level of detail to display;
- retrieving, based on the received input, the combined confidence score from the two-way tree-structured index; and
- displaying, on the display device, the retrieved combined confidence score.

18. A non-transitory computer-readable medium comprising one or more computer-executable instructions that, when executed by at least one processor of a computing device, cause the computing device to:
- identify, at the computing device, at least one informative word in a digital text; and
- perform a security action that identifies privacy leakage information, wherein the security action comprises:
  - determining, for at least one identified informative word, a type of privacy leakage and a respective confidence score indicating a probability the identified informative word causes the type of privacy leakage;
  - determining, using the respective confidence score, a combined confidence score for each respective element within a level of detail to display; and
  - displaying, on a display device, the combined confidence score for each respective element within the level of detail to display.

19. The non-transitory computer-readable medium of claim 18, further comprising one or more computer-executable instructions that, when executed by at least one processor of the computing device, cause the computing device to receive, from a graphical user interface, an input indicating the level of detail to display.

20. The non-transitory computer-readable medium of claim 18, wherein the displaying further comprises determining a two-way tree-structured index comprising:
- the combined confidence score for each respective element within each of the levels of detail; and
- associations between related elements across different levels of detail.

* * * * *